US012776842B2

(12) United States Patent
Nayar et al.

(10) Patent No.: US 12,776,842 B2
(45) Date of Patent: *Oct. 27, 2026

(54) LOW POWER LIGHT WAVE COMMUNICATION FOR MOBILE AND WEARABLE DEVICES

(71) Applicant: Snap Inc., Santa Monica, CA (US)

(72) Inventors: Shree K. Nayar, New York, NY (US); Mikhail Fridberg, Sharon, MA (US); Mohit Gupta, Madison, WI (US)

(73) Assignee: Snap Inc., Santa Monica, CA (US)

( * ) Notice: Subject to any disclaimer, the term of this patent is extended or adjusted under 35 U.S.C. 154(b) by 194 days.

This patent is subject to a terminal disclaimer.

(21) Appl. No.: 18/418,515

(22) Filed: Jan. 22, 2024

(65) Prior Publication Data

US 2024/0162983 A1 May 16, 2024

Related U.S. Application Data

(63) Continuation of application No. 17/371,669, filed on Jul. 9, 2021, now Pat. No. 11,901,941, which is a continuation of application No. 16/418,971, filed on May 21, 2019, now Pat. No. 11,082,129.

(60) Provisional application No. 62/674,349, filed on May 21, 2018.

(51) Int. Cl.

| | |
|---|---|
| ***H04B 10/114*** | (2013.01) |
| ***H04B 1/3827*** | (2015.01) |
| ***H04B 10/116*** | (2013.01) |
| ***H04J 14/08*** | (2006.01) |
| ***H04L 7/00*** | (2006.01) |
| *G02C 11/00* | (2006.01) |

(52) U.S. Cl.

CPC ......... *H04B 10/116* (2013.01); *H04B 1/3827* (2013.01); *H04B 10/114* (2013.01); *H04B 10/1143* (2013.01); *H04B 10/1149* (2013.01); *H04J 14/08* (2013.01); *H04L 7/0075* (2013.01); *G02C 11/10* (2013.01); *H04B 2001/3866* (2013.01)

(58) Field of Classification Search

CPC ... H04B 10/11; H04B 10/114; H04B 10/1143; H04B 10/1149; H04B 10/116; H04B 1/3827; H04J 14/08; H04L 7/0075

USPC .......................................... 398/118-131, 103

See application file for complete search history.

(56) References Cited

U.S. PATENT DOCUMENTS 7,352,930 B2 * 4/2008 Lowles ................ G02B 6/4298 385/39
9,866,369 B1 * 1/2018 Haynes ................. H04L 7/0037
11,082,129 B1 * 8/2021 Nayar .................. H04B 10/116

(Continued)

OTHER PUBLICATIONS

"U.S. Appl. No. 16/418,971, Examiner Interview Summary mailed Nov. 10, 2020", 3 pgs.

(Continued)

*Primary Examiner* — Li Liu
(74) *Attorney, Agent, or Firm* — Schwegman Lundberg & Woessner, P.A.

(57) ABSTRACT

A client device, such as a mobile phone or a mobile phone accessory (e.g., phone case), is provided that receives and transmits data (e.g., a social media code) via light wave communication. The light wave communication may comprise structured light (e.g., projected light patterns). The client device may include a lightbox comprised of LEDs located on a back face of the client device.

20 Claims, 12 Drawing Sheets

(56) References Cited

U.S. PATENT DOCUMENTS

| | | | | |
|---|---|---|---|---|
| 11,901,941 | B2 * | 2/2024 | Nayar | H04B 1/3833 |
| 2002/0080719 | A1 | 6/2002 | Parkvall et al. | |
| 2002/0145038 | A1 | 10/2002 | Ohagan et al. | |
| 2008/0094244 | A1 * | 4/2008 | Oh | H04M 1/724 340/815.45 |
| 2011/0026918 | A1 * | 2/2011 | Kim | H04B 10/1143 398/130 |
| 2013/0021924 | A1 * | 1/2013 | Ericson | H04L 1/1835 370/252 |
| 2013/0095773 | A1 * | 4/2013 | Long | H04M 1/6066 455/74 |
| 2013/0236183 | A1 * | 9/2013 | Chao | H04B 10/116 398/101 |
| 2013/0285836 | A1 * | 10/2013 | Proud | G16H 40/40 340/870.02 |
| 2014/0236847 | A1 * | 8/2014 | Hamilton | G06Q 10/40 705/319 |
| 2015/0365168 | A1 * | 12/2015 | Arimura | H04W 56/0015 398/52 |
| 2016/0218804 | A1 * | 7/2016 | Raj | H05B 47/1995 |
| 2016/0352430 | A1 * | 12/2016 | Mathews | H04B 10/1143 |
| 2017/0012702 | A1 * | 1/2017 | Hamilton | H04B 10/1149 |
| 2017/0310743 | A1 * | 10/2017 | Aoyama | G06F 16/958 |
| 2018/0013496 | A1 * | 1/2018 | Liu | H04B 10/60 |
| 2019/0325498 | A1 * | 10/2019 | Clark | G06Q 30/0643 |
| 2020/0007231 | A1 * | 1/2020 | Van De Sluis | H04B 10/116 |
| 2020/0295830 | A1 * | 9/2020 | Liu | H04B 10/564 |
| 2022/0038179 | A1 | 2/2022 | Nayar et al. | |

OTHER PUBLICATIONS

"U.S. Appl. No. 16/418,971, Non Final Office Action mailed Aug. 7, 2020", 13 pgs.

"U.S. Appl. No. 16/418,971, Notice of Allowance mailed Apr. 2, 2021", 5 pgs.

"U.S. Appl. No. 16/418,971, Notice of Allowance mailed Dec. 15, 2020", 5 pgs.

"U.S. Appl. No. 16/418,971, Response filed Jul. 20, 2020 to Restriction Requirement mailed May 19, 2020", 8 pgs.

"U.S. Appl. No. 16/418,971, Response filed Nov. 9, 2020 to Non Final Office Action mailed Aug. 7, 2020", 13 pgs.

"U.S. Appl. No. 16/418,971, Restriction Requirement mailed May 19, 2020", 7 pgs.

"U.S. Appl. No. 17/371,669, Advisory Action mailed Jul. 13, 2023", 3 pgs.

"U.S. Appl. No. 17/371,669, Examiner Interview Summary mailed Sep. 15, 2023", 3 pgs.

"U.S. Appl. No. 17/371,669, Final Office Action mailed Jun. 9, 2023", 11 pgs.

"U.S. Appl. No. 17/371,669, Non Final Office Action mailed Feb. 21, 2023", 17 pgs.

"U.S. Appl. No. 17/371,669, Notice of Allowance mailed Sep. 28, 2023", 7 pgs.

"U.S. Appl. No. 17/371,669, Preliminary Amendment filed Oct. 25, 2021", 7 pages.

"U.S. Appl. No. 17/371,669, Response filed May 15, 2023 to Non Final Office Action mailed Feb. 21, 2023", 13 pgs.

"U.S. Appl. No. 17/371,669, Response filed Jun. 29, 2023 to Final Office Action mailed Jun. 9, 2023", 10 pgs.

* cited by examiner

400

LOW POWER LIGHT WAVE COMMUNICATION FOR MOBILE AND WEARABLE DEVICES

CLAIM OF PRIORITY

This application is a continuation of U.S. patent application Ser. No. 17/371,669, filed Jul. 9, 2021, which application is a continuation of U.S. patent application Ser. No. 16/418,971, filed May 21, 2019, which claims the benefit of priority to U.S. Provisional Application Ser. No. 62/674,349, filed May 21, 2018, each of which are incorporated herein by reference in their entireties.

TECHNICAL FIELD

The present disclosure generally relates to special-purpose machines and improvements to such variants, and to the technologies by which such special-purpose machines become improved compared to other special-purpose machines for light wave communication for mobile devices.

BRIEF DESCRIPTION OF THE DRAWINGS

In the accompanying drawings, some embodiments are illustrated by way of example and not limitation.

DETAILED DESCRIPTION

Figure 1:
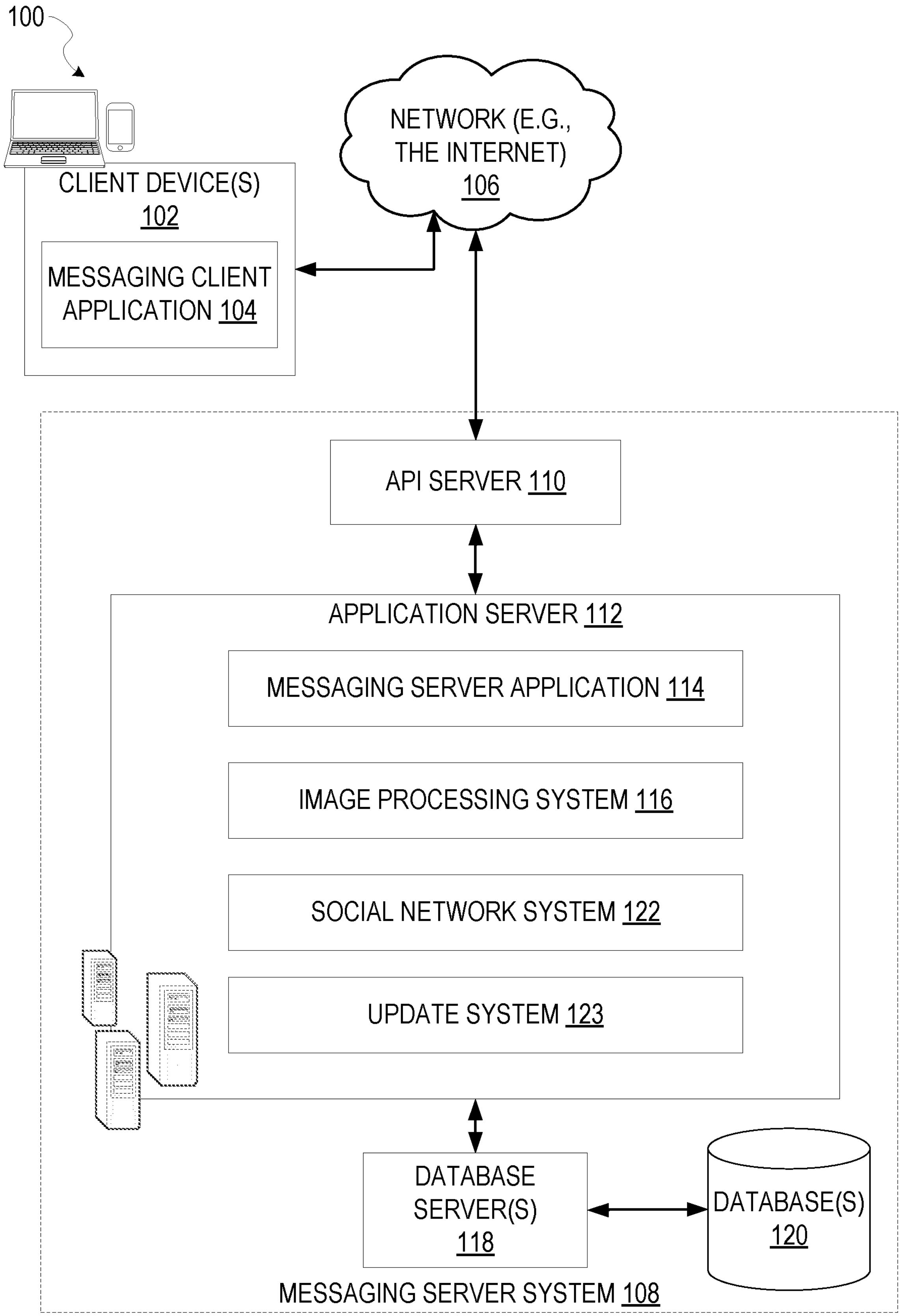
FIG. 1 is a block diagram for explaining an example messaging system for exchanging data (e.g., messages and associated content) over a network in accordance with some embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details.

In particular, peripheral devices or circuits with attached light sources and sensors are described for low power light wave communication for mobile or wearable devices. Some embodiments operate as a peripheral device attached to a client device (e.g. a cell phone) to enable very low power communication of simple information, such as a social media code. For example, such a peripheral device attached to a housing or case of a cell phone enables a user of the cell phone to quickly exchange information when the cell phone is powered down. This is done with a peripheral device that receives and transmits data via light wave communication. Other embodiments can be integrated with a wearable device, such as a pair of glasses, a keychain, an armband, a watch, or other such "smart" devices which contain electronic circuitry. In each case, other systems which can involve boot time or navigation are avoided. Some embodiments thus allow data exchange is performed using a simple easily accessible physical input.

Simple and efficiently structure of such as a peripheral device using light emitting diodes (LEDs), a small memory device, and a microcontroller can enable a device to transmit and received certain specific types of information, such as social media codes, over short distances using very little power. A small form factor peripheral device including such elements with a battery can operate for long periods of time (e.g. months or years) without a need for battery replacement or recharging. Similarly, integration with wearable devices can be configured to use very little of the limited battery resources of such a device.

Two peripheral devices can exchange data quickly and efficiently without navigation or the long boot-up time of a more complex device, such as a smartphone. When used with a smartphone, the exchanged information can be stored in a memory of the peripheral device until a later time when the more smartphone device is booted, and the host phone can synchronize with the peripheral to receive and store the data (e.g. using a social media application to synchronize with the peripheral).

Additionally, by using light wave communication, it is possible to securely exchange data such as a social media code. It is also possible to share personal information in such a way that neither the mobile device nor an application on the mobile device needs to be open. It is therefore possible to quickly and safely share data via light wave communication, which is important for users on the go. Various embodiments using one or more sources of infrared, white light, or colored light can be used to communicate information in different patterns in a way that is secure from devices not in close proximity. Accordingly exchange of personal information and social interaction may be facilitated while reducing privacy issues.

FIG. 1 shows a block diagram of an example messaging system 100 for exchanging data (e.g., messages and associated content) over a network 106. The messaging system 100 includes multiple client devices 102, each of which hosts a number of applications including a messaging client application 104. Each messaging client application 104 is communicatively coupled to other instances of the messaging client application 104 and a messaging server system 108 via the network 106 (e.g., the Internet).

Accordingly, each messaging client application 104 is able to communicate and exchange data with another messaging client application 104 and with the messaging server system 108 via the network 106. The data exchanged between messaging client applications 104, and between a messaging client application 104 and the messaging server system 108, includes functions (e.g., commands to invoke functions) as well as payload data (e.g., text, audio, video, or other multimedia data).

The messaging server system 108 provides server-side functionality via the network 106 to a particular messaging client application 104. While certain functions of the messaging system 100 are described herein as being performed either by a messaging client application 104 or by the messaging server system 108, it will be appreciated that the location of certain functionality within either the messaging client application 104 or the messaging server system 108 is a design choice. For example, it may be technically preferable to initially deploy certain technology and functionality within the messaging server system 108 and to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include message content, client device information, geolocation information, media annotation and overlays, message content persistence conditions, social network information, and live event information, as examples. Data exchanges within the messaging system 100 are invoked and controlled through functions available via user interfaces of the messaging client application 104.

Turning now specifically to the messaging server system 108, an application programming interface (API) server 110 is coupled to, and provides a programmatic interface to, an application server 112. The application server 112 is communicatively coupled to a database server 118, which facilitates access to a database 120 in which is stored data associated with messages processed by the application server 112.

The API server 110 receives and transmits message data (e.g., commands and message payloads) between the client devices 102 and the application server 112. Specifically, the API server 110 provides a set of interfaces (e.g., routines and protocols) that can be called or queried by the messaging client application 104 in order to invoke functionality of the application server 112. The API server 110 exposes various functions supported by the application server 112, including account registration; login functionality; the sending of messages, via the application server 112, from a particular messaging client application 104 to another messaging client application 104; the sending of media files (e.g., images or video) from a messaging client application 104 to a messaging server application 114 for possible access by another messaging client application 104; the setting of a collection of media data (e.g., a story); the retrieval of such collections; the retrieval of a list of friends of a user of a client device 102; the retrieval of messages and content; the adding and deletion of friends to and from a social graph; the location of friends within the social graph; and opening application events (e.g., relating to the messaging client application 104).

The application server 112 hosts a number of applications and subsystems, including the messaging server application 114, an image processing system 116, a social network system 122, and an update system 123, in some example embodiments. The messaging server application 114 implements a number of message-processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor- and memory-intensive processing of data may also be performed server-side by the messaging server application 114, in view of the hardware requirements for such processing.

The application server 112 also includes the image processing system 116, which is dedicated to performing various image processing operations, typically with respect to images or video received within the payload of a message at the messaging server application 114.

The social network system 122 supports various social networking functions and services and makes these functions and services available to the messaging server application 114. To this end, the social network system 122 maintains and accesses an entity graph (e.g., entity graph 304 in FIG. 3) within the database 120. Examples of functions and services supported by the social network system 122 include the identification of other users of the messaging system 100 with whom a particular user has relationships or whom the particular user is "following," and also the identification of other entities and interests of a particular user.

The update system 123 manages training and deployment of machine learning schemes and models distributed to a plurality of client devices (e.g., client device 102). In some example embodiments, the update system 123 trains the neural network models on sets of keywords to be recognized on the client device 102. The trained models are then distributed as part of the messaging client application 104 download discussed below, or as an update to the messaging client application 104.

The application server 112 is communicatively coupled to the database server 118, which facilitates access to the database 120 in which is stored data associated with messages processed by the messaging server application 114.

In some embodiments of a social network system 122, users may have an associated social media code that can be represented as a two-dimensional image containing a fixed amount of data. Users can capture images of each other's social media codes as represented in such images to exchange information. Such a process, however, can be time consuming and resource intensive, involving a camera and significant processor and battery resources. A two-dimensional a social media code is particular targeted information for communication in accordance with some example embodiments. This information can be stored in a simplified format in a memory of a peripheral device for exchange using multiple peripherals instead of the more complex host devices (e.g. phone, laptop, etc.) associated with the peripheral. In various embodiments, the shared data is a code relating to personal or identifying information, such as a face, a name, phone number, email address, mailing address, etc. In one embodiment, a targeted the social media code is 168 bits that can be represented either in a complex image, or in a simplified format in a peripheral device. In other embodiments, the social media code may be any other suitable number of bits or format. In embodiments targeted to particular data, such as a two-dimensional code with a set number of bits, the memory associated with a device configured for low power light wave communication can be particularly structured to communicate and receive such codes, and to store the codes in memory when an attached device is powered off. For example, a peripheral element such as the one illustrated in FIGS. 2A-B can include memory and circuitry particularly adapted to a specific code, such that a code associated with a device can be transmitted by the light wave communication peripheral even when the device is powered off. Similarly, the peripheral can store a limited number of codes from other devices or code sources when the device attached to the peripheral is powered off, and the peripheral can then communicate these received codes to the device when the device is later powered on.

Figure 2A:
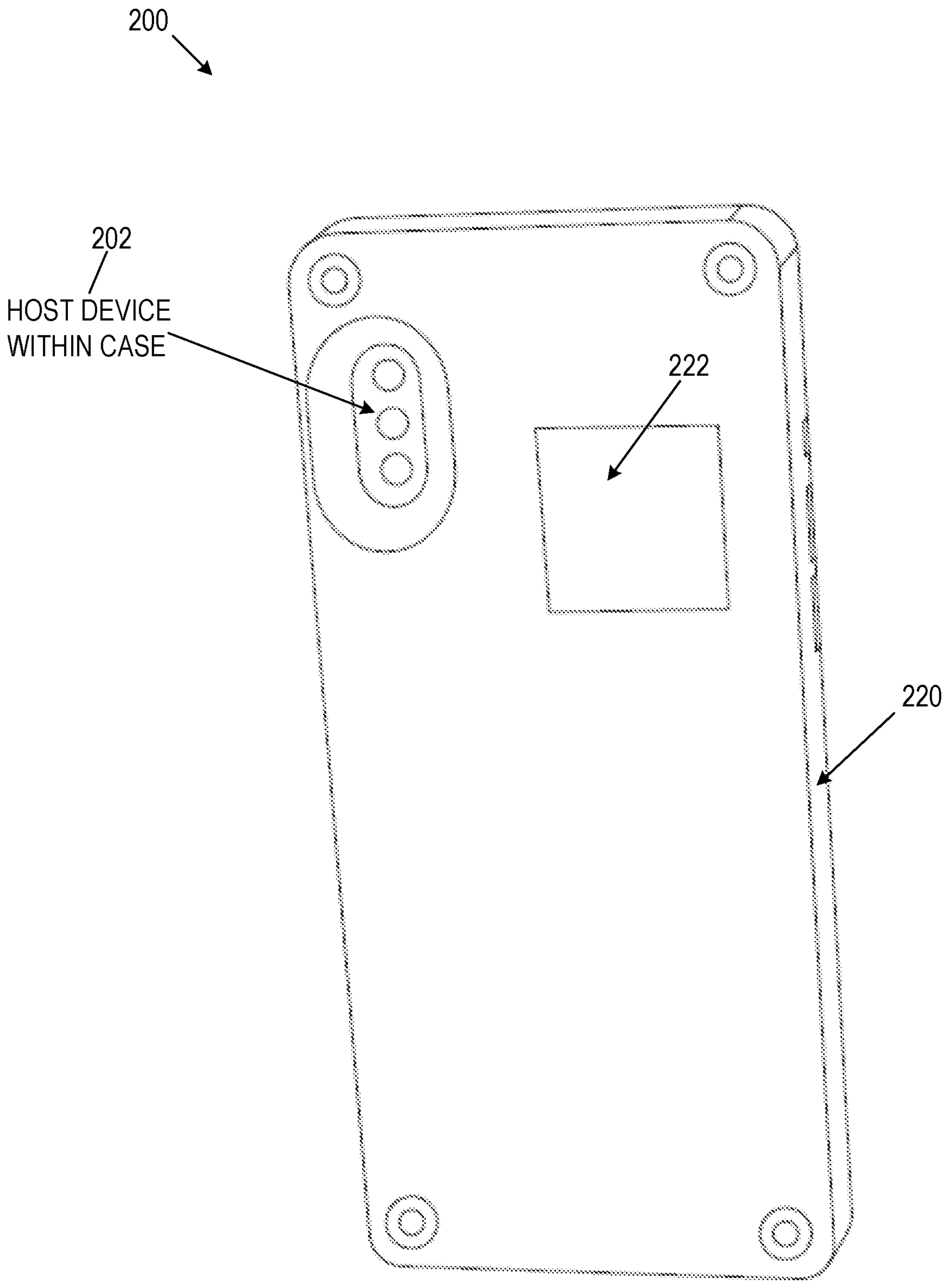
FIGS. 2A-2B are representational views of an example device such as a wearable device, mobile phone or a mobile phone accessory (e.g., phone case) that receives and transmits data via light wave communication in accordance with some embodiments.
Figure 2B:
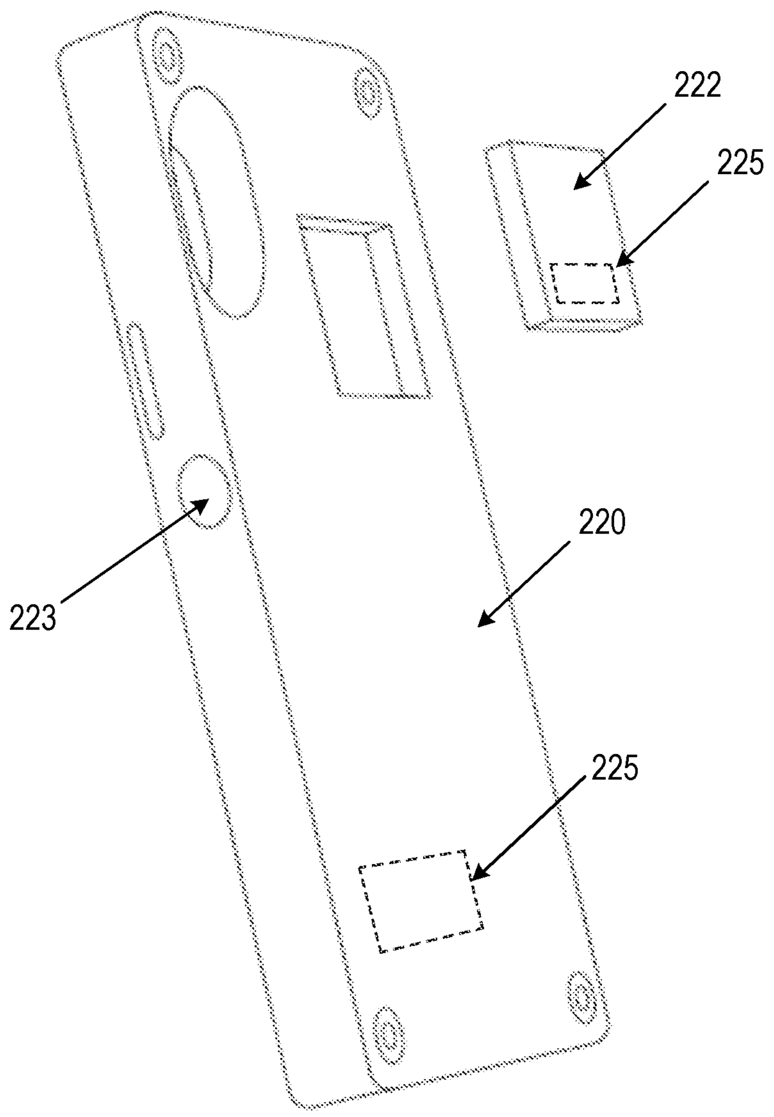

FIGS. 2A-2B are representational views for explaining a system 200 including a host device 202 and a case 220 for the host device 202, where the case 220 includes a peripheral device 222 to enable low power light wave communication. In various other embodiments, such a peripheral device 222 can be integrated with a host device 202, part of a separate case 220, part of a wearable device, or any other such system where a simple and quick exchange of small amounts of data is desirable (e.g. without dependency on a boot time of a complex system).

As illustrated in FIG. 2A, the host device 202 is surrounded by and protected by case 220, so that only certain portions (e.g. sensors and buttons) are exposed and visible. The case 220 includes a peripheral device 222 on a back face of the case 220 surrounding the host device 202. The peripheral device 222 is exposed and positioned for simple and quick light wave communication with another similar peripheral device when the devices are brought in proximity within the correct position, regardless of a power state of host device 202. FIG. 2B shows case 220 without host device 202, and with a removable box form factor for the peripheral device 222. In some embodiments, a case 220 can include a battery for the peripheral device to allow a larger battery or other resources or form factors (memory, buttons, switches, etc.) In some such embodiments, this enables control circuitry, sensors, and illumination devices (e.g. LEDs and associated drivers) to be removed and replaced. In some embodiments, the peripheral device 222 can be connected to the case 220 and/or host device 202 via a cable and wired circuitry for power and communication with host device 202. In some embodiments, peripheral device 222 includes wireless communication circuitry 225 for low-power wireless communication with host device 202 (e.g. low energy Bluetooth, etc.) In some embodiments, peripheral device 222 is integrated with case 220 and not removable.

As illustrated in FIG. 2B, a case 220 can include an input device 223 which can be a physical button, a switch, or any other such input device to activate a light wave communication process to share data. As shown, input device 223 connects to peripheral device 222 when the peripheral device 222 is in case 220 so that light wave communication is triggered by input device 223 (e.g. pressing a button, a manual switch on the client device, etc.) that begins the light wave communication process without powering on the host device 202 (e.g. the process can occur without opening a phone or an application on the phone.) Any data (e.g. a social media code) received a peripheral device 222 can be communicated to host device 202 later when the device is powered on or when the data is requested by a social media application operating on host device 202. In the embodiment of FIG. 2B, input device 223 is a button located on a side face of the case 220. In other embodiments, such a button may be located in any suitable location on a host device, a case of the host device, on a wearable device, or in any functional position that is easily accessible for quick exchange of simple data such as social media codes.

Figure 3:
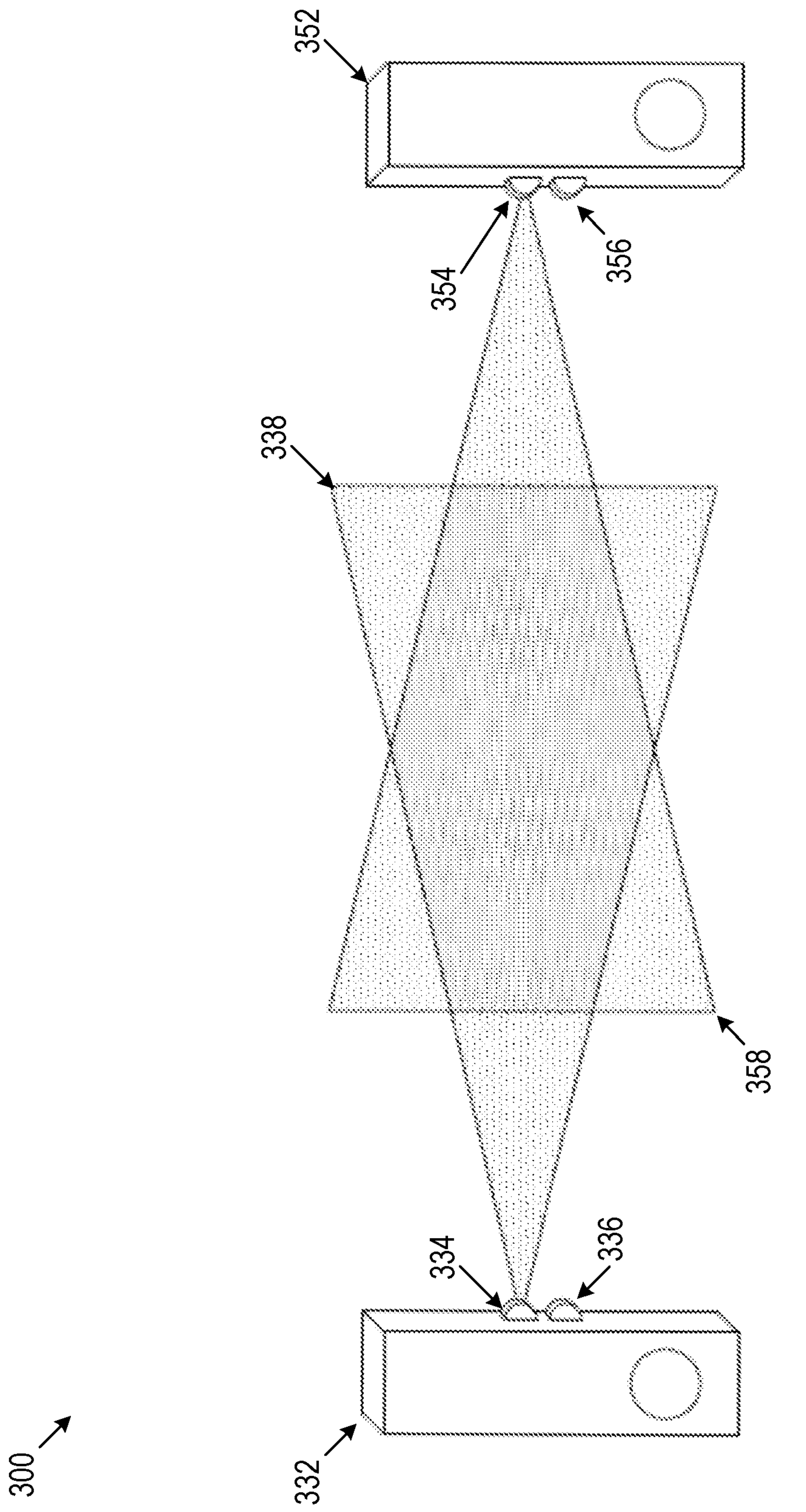
FIG. 3 is a representational view for explaining temporal communication of a social media code according to some example embodiments.

FIG. 3 shows system 300 with two peripheral devices exchanging data. Each peripheral device 332 and 352 is associated with a host device that is further associated with a social media code. FIG. 3 includes two peripheral devices 332 and 352, each containing an illumination source 334, 354 (e.g. an LED, IR source, multiple such elements, or other illumination device), a sensor 336, 356 (e.g. a sensor to detect matching wavelengths of light emitted by illumination source 334, 354). The illumination sources emit respective light waves 338 and 358 which can be used to communicate social media codes. The sensors 336, 356 can detect the patterns of data to identify the social media codes, and store the social media codes in memory integrated with or attached to the peripheral devices 332, 352.

FIG. 3 is a representational view for explaining temporal communication of a social media code according to some example embodiments. When using structured light for light wave communication between two or more host device 332, 352, there may be various sources of error, such as crosstalk (e.g. between a transmitting client device and a receiving client device) and reflections (e.g., a transmitted code being reflected back by the scene). In one embodiment, each peripheral device includes at least one illumination device, such as a light emitting diode (LED), that converts the data (e.g., social media code) into a temporal code by flickering on and off (e.g. amplitude modification of the output power of the light from the illumination source 334, 354). In one embodiment, the illumination device flickers on and off a at a high rate to transmit binary data. In various embodiments, the illumination device is controlled by a microcontroller or control circuitry included in the peripheral device. In response to initiation of the light wave communication process (e.g., by pressing a button such as input device 223), the client device scans for data using sensors such as sensors 336, 356. In one embodiment, the time at which the two client devices initiate the light wave communication process overlaps by some predetermined amount of time in order for the light wave communication process to begin.

Figure 4:
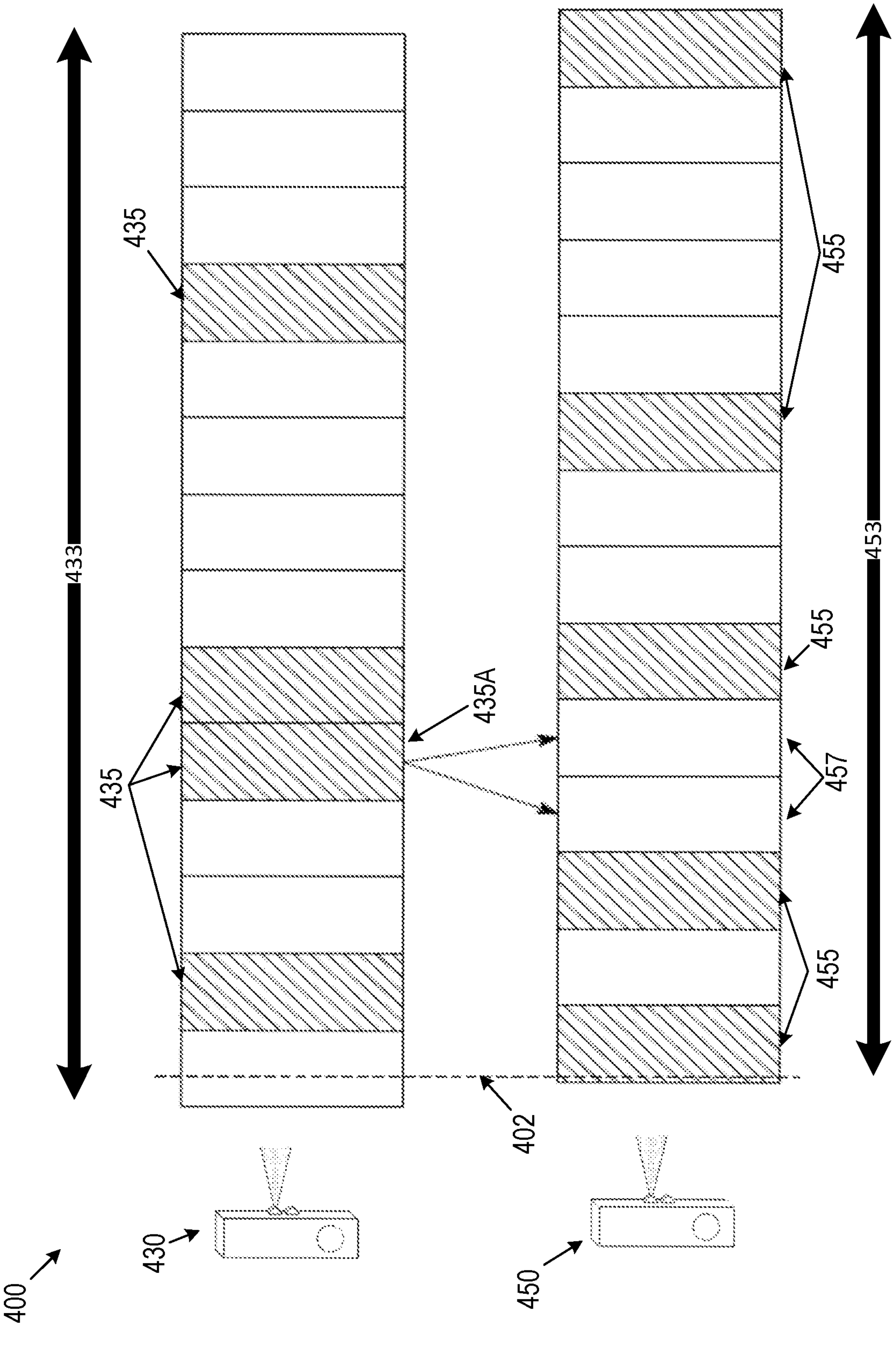
FIG. 4 illustrates a representational view for explaining asynchronous stochastic transmission of a social media code via light wave communications according to some example embodiments.

FIG. 4 illustrates a representational view for explaining asynchronous stochastic transmission between two peripheral devices 430, 450 as part of system 400. As illustrated, a first peripheral device and a second peripheral device both perform a communication process in an overlapping period of time while within each other's field of view and within a threshold transmit distance (e.g. as illustrated by FIG. 3) to engage in low power light wave communication. When the circuitry of a peripheral device receives a signal to perform the light wave communication (e.g. via a button or switch), the communication operation is structured for a set of time period (e.g. 1 millisecond (ms), 5 ms, 100 ms, etc.). Whatever the time period that the system operates on, a subset of the time periods are used by each peripheral device to transmit. As shown, peripheral device 430 performs the communication process for a plurality of time periods 433, which includes a first set of time periods 435 where peripheral device 430 transmits light with encoded data. Similarly, peripheral device 450 transmits for a plurality of time periods 453, including a second set of time periods 455 where the illumination device (e.g. LED, IR source, etc.)

transmits. In some embodiments, a complete social media code is transmitted during a single time period where a device is transmitting (e.g. a complete code is transmitted during each time period of the set of time periods 435). In other embodiments, other data structures can be used. Because there is no synchronization between peripheral devices 430, 450, there is an offset 402 between the time periods. Data transmitted during time period 435A of peripheral device 430 will be received at peripheral device 450 during a portion of time periods 457.

Thus, in some embodiments, for a transmitted data block to be received by a first peripheral device, the second peripheral device does not transmit in the two neighboring data blocks. In some embodiments, the client devices therefore are configured to transmit only during a portion of the various time periods in order to avoid interferences and corrupting information received at the sensors.

Circuitry in each peripheral device can process the data received at a sensor, and determine if a valid social media code is received. In some embodiments, when a valid code is detected by the circuitry, an output signal is sent. This output signal can be a visible light signal (e.g. specific colors or a specific flashing pattern). In other embodiments, the signal can be a sound signal from a speaker or buzzer device.

Figure 5:
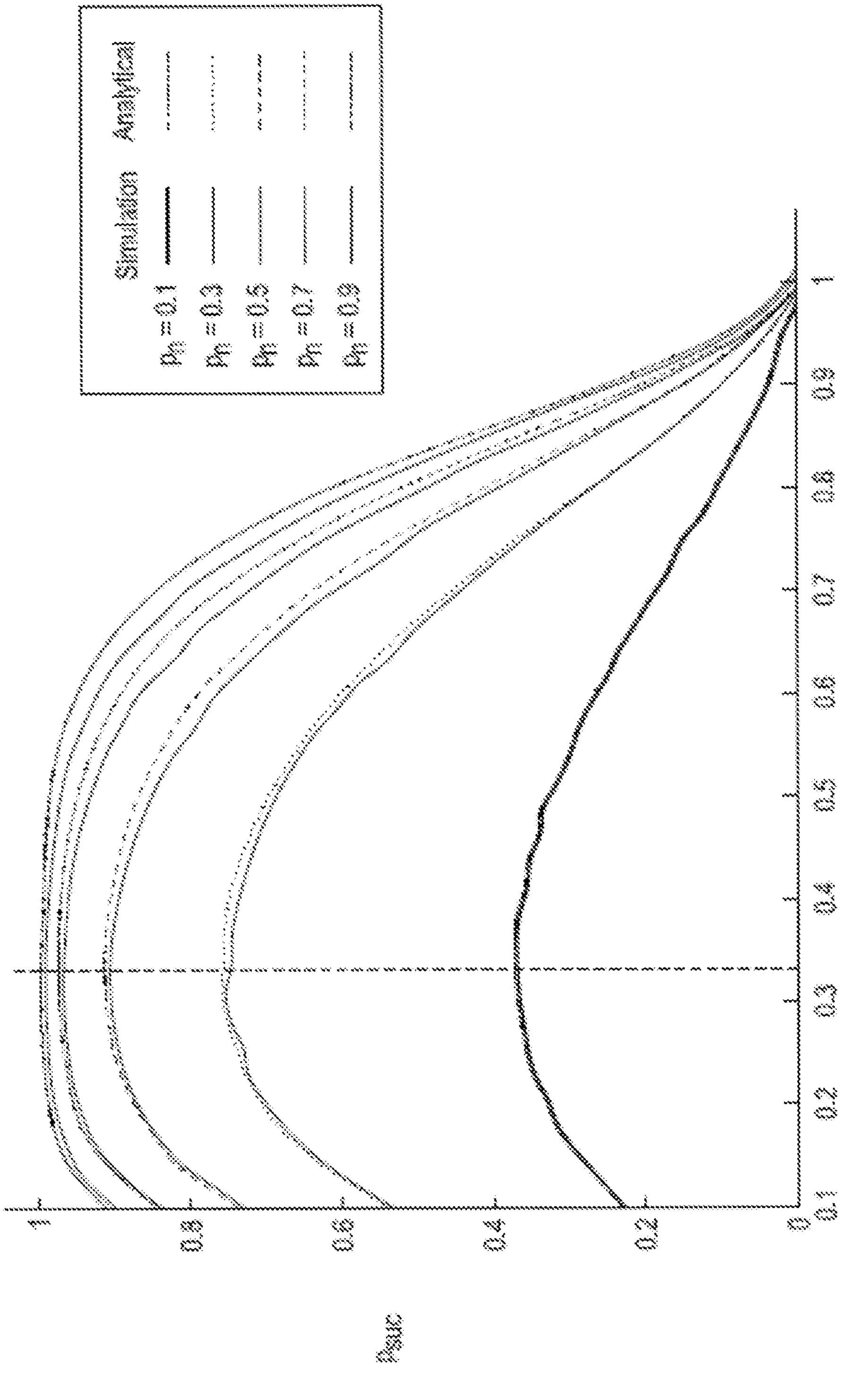
FIG. 5 illustrates a representational view for explaining aspects of a light wave communication system in accordance with some example embodiments.

FIG. 5 illustrates a representational view for explaining the probability of success of transmission of a social media code according to some example embodiments. In various embodiments, probability of a second client device receiving a social media code from a first client device in any block and in N blocks may be determined as illustrated. A transmission probability Pt (e.g. the percentage, number, or probability of transmission in any given time periods) is graphed on the x axis, and a simulated and experimentally determined success rate Psuc is identified on the y axis, for various noise levels Pn, with increasing amounts of noise represented by larger values. The example transmission strategy is independent of window size N.

By having each peripheral device randomly select the time periods where data will be transmitted with a Pt between 0.15 and 0.5, there is an increased likelihood of successful reception and decoding of the data. In some embodiments, a probability of success occurs at or near a random transmission rate of ⅓ of the total number of time periods. Various embodiments can deviate from this rate for various reasons, including power conservation, particular device configurations, or other such reasons. Some embodiments can target specific rates of transmission (e.g. an average number of transmission time periods per total time periods) to be a transmission rate of three time periods for every ten total time periods, to be an overall Pt of around 0.33, or using other such mechanisms. In one embodiment, circuitry can randomly select ten of every thirty time periods for light wave data transmission. In some embodiments, circuitry of a peripheral device is configured to generate a random selection of time periods for transmission, with a target to transmit during one third of the time periods. In some such embodiments, a minimum number of time periods for transmission per set number of time periods can be selected to avoid issues with extreme randomness.

Figure 6A:
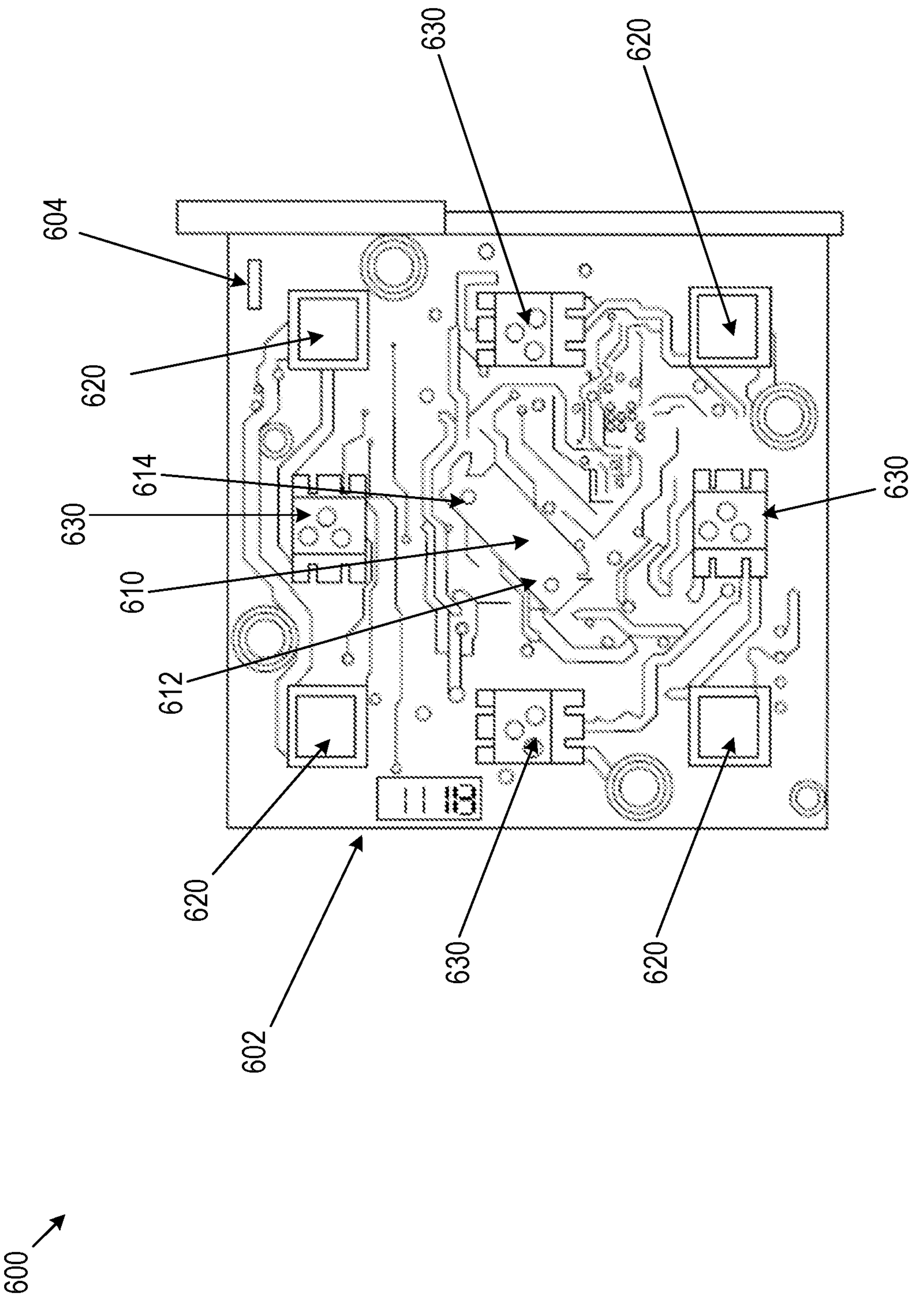
FIG. 6A-B illustrates a representational view for explaining one example implementation of a circuit for a peripheral device for low power light wave communication according to an example embodiment.
Figure 6B:
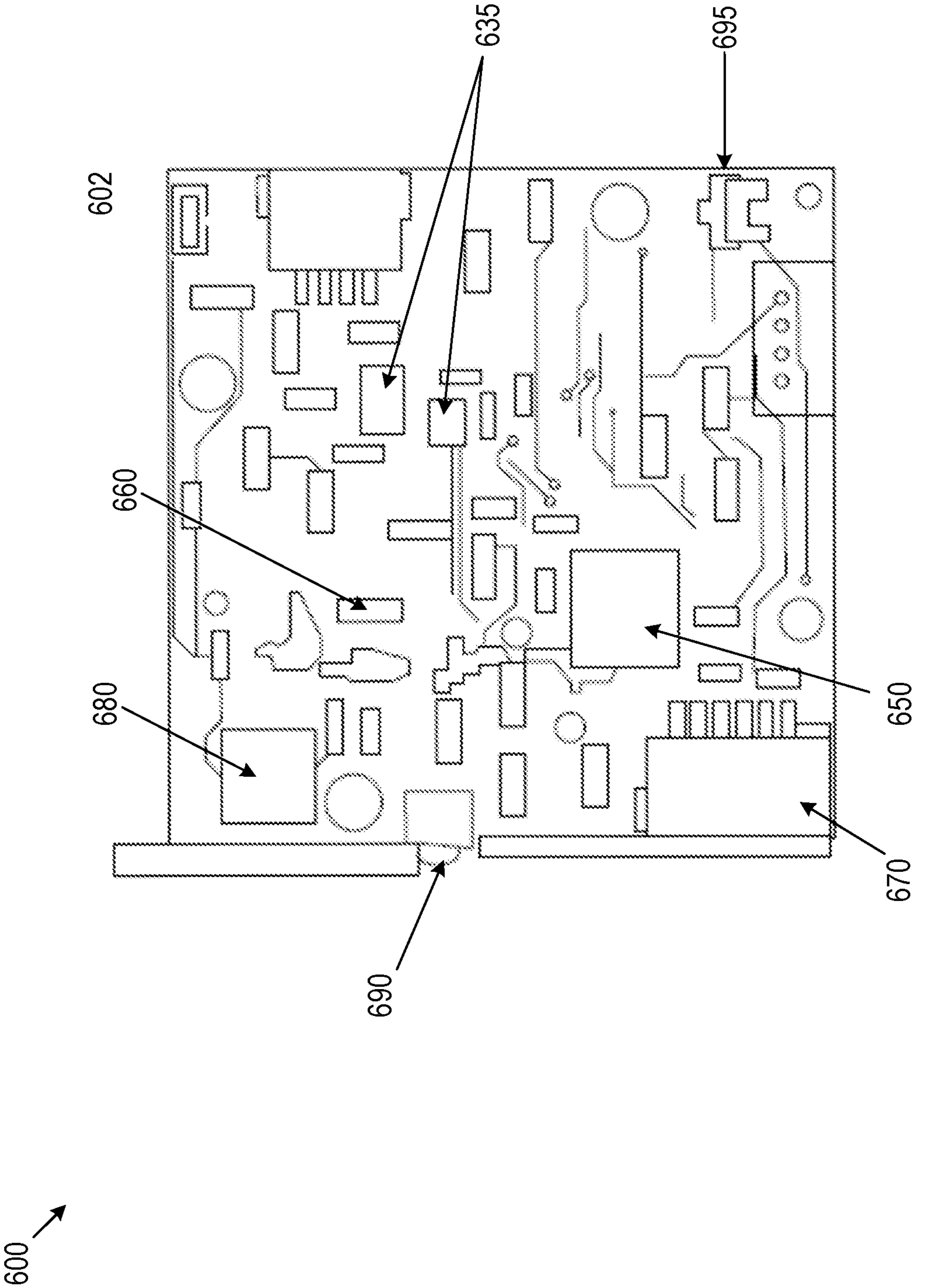

FIGS. 6A-B illustrates a representational view for explaining one example implementation of aspects of a peripheral device 600 according to an embodiment. In the embodiment of FIG. 6, the circuit board 602 of a peripheral device 600 includes several illumination devices, namely white light emitting LEDs 620, color LEDs 630, and an infrared LED 614. Light 604 indicates when the peripheral device 600 is performing a communication process (e.g. in response to input device 690 being depressed). The circuit board 602 additional includes power supply circuitry 660, a speaker 680 for indicating successful receipt of data, and a connector for power and data 670. The circuit illustrated in FIG. 6 also includes an infrared detector 612 of IR circuit 610, LED drivers 635, and a microcontroller 670.

Figure 7:
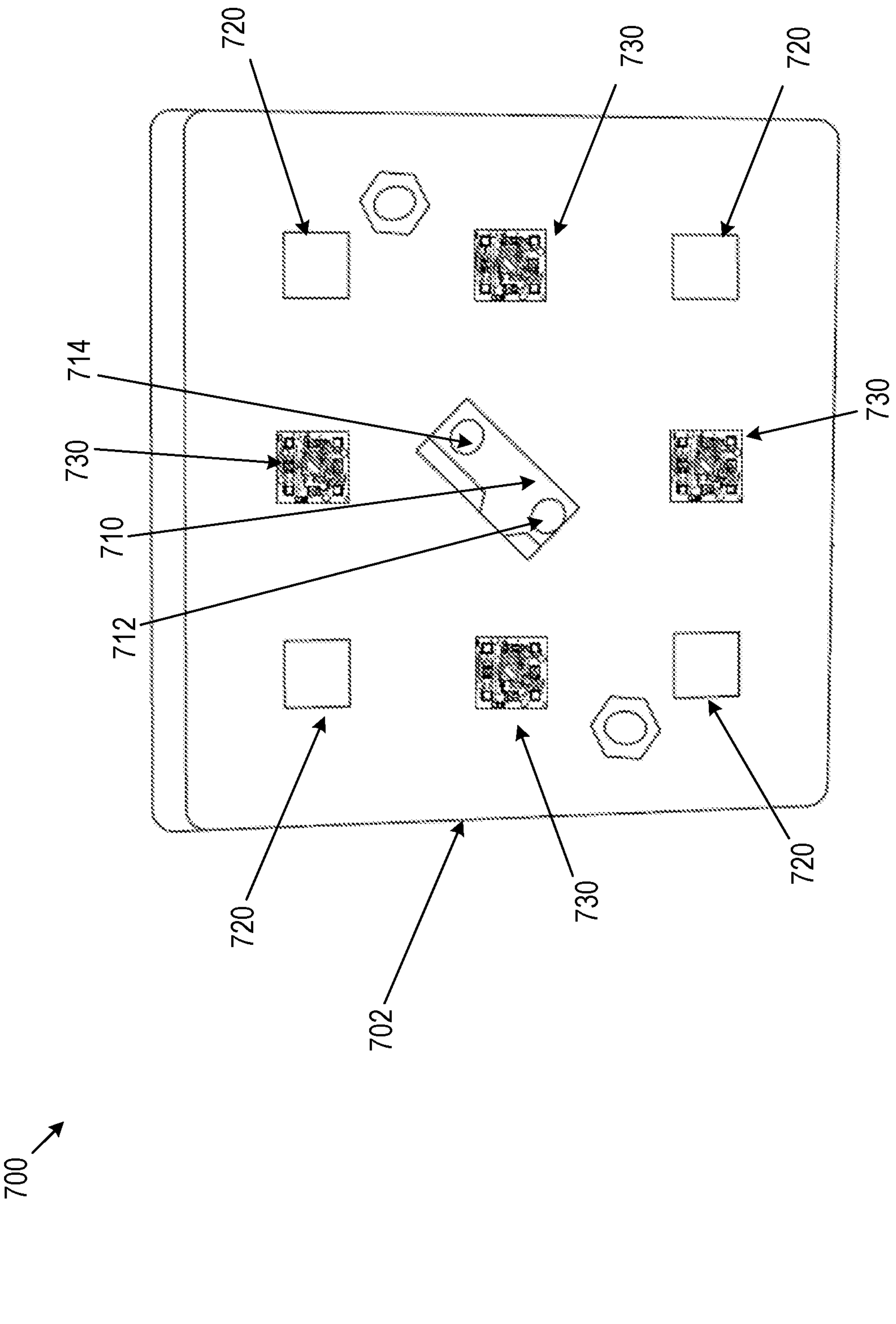
FIG. 7 illustrates aspects of a peripheral device for low power light wave communication according to an example embodiment.

FIG. 7 illustrates a peripheral device 700 in a package 702 with white light LEDs 730, color LEDs 720, as well as sensor 714 and IR LED 714 of IR circuitry 710 exposed an able to transmit and receive information as part of light wave communications. In some embodiments, package 702 can be similar to peripheral device 222 of FIGS. 2A and 2B In peripheral device 700 there are 4 groups of light emitting diodes (LEDs), each group having one or more individual LEDs. In other embodiments, there may be one or more groups of LEDs, each group having one or more individual LEDs. The individual LEDs may be one of: white light emitting LED, color (e.g., red, blue, or green) light emitting LED, and infrared LED. In one embodiment, each group comprises at least one white LED, at least one color LED, and at least one infrared LED. In one embodiment, the light wave communication comprises structured light (e.g., projected light patterns), which can comprise visible or invisible light such as infrared light. In one embodiment, the client device includes a lightbox located on a back face of the client device, and the lightbox is used for light wave communication.

In one embodiment, the light wave communication is triggered by pressing a button (e.g., a manual switch) on the client device that begins a communication process by projecting structured light. In this way, neither the mobile device nor an application on the mobile device needs to be open in order to share data, such that time may be saved and privacy issues may be reduced As described herein, two such peripheral devices can be brought in proximity and used to communicate data, such as social media codes, using low power processes without synchronization. In some embodiments, the data stored at a device can include additional share data describing the use of the peripheral device. Such share data can include information about use times, failure rates, failed attempts to share data, or other such data in addition to social media codes.

In one embodiment, share data can include time and location data. In other such embodiments, time and location data from a host device may be used to determine the time and location of collection of each of the social media codes. It is therefore possible to create a meeting log of people that have been met by a user, including times, dates and locations. In some embodiments, a light wave representation of the collected information is provided and displayed to a user. In one embodiment, a calendar is automatically populated with information about meetings with people, including, for example, names, faces, dates and times.

In such an embodiment, when a host device synchronizes with a peripheral device to gather social media codes, a social media application or a meeting application can sort the social media codes and associate them with times, places, calendar information from the host device, or any other such information. The social media codes can thus be used with other share data or host device metadata to organize social media codes and related data around meeting events.

In one embodiment, the shared data is a code that includes information relating to a social media account, or other personal information (e.g., a face, a name, phone number, email address, mailing address, etc.). The number of bits in the code may be, for example, 168 bits.

In one embodiment, when the mobile device is opened, the social media codes that have been newly collected (by the light wave communication process) are obtained by the mobile device, or by an application on the mobile device. In one embodiment, the social media codes are obtained via Bluetooth, or any other suitable method.

In one embodiment, time and location data from the mobile device may be used to determine the time, date and location of collection of each of the social media codes. It is therefore possible to create a meeting log of people that have been met, including times and locations. In some embodiments, a light wave representation of the collected information is provided and displayed to a user. In one embodiment, a calendar is automatically populated with information about meetings with people, including, for example, names, faces, dates and times.

Figure 8:
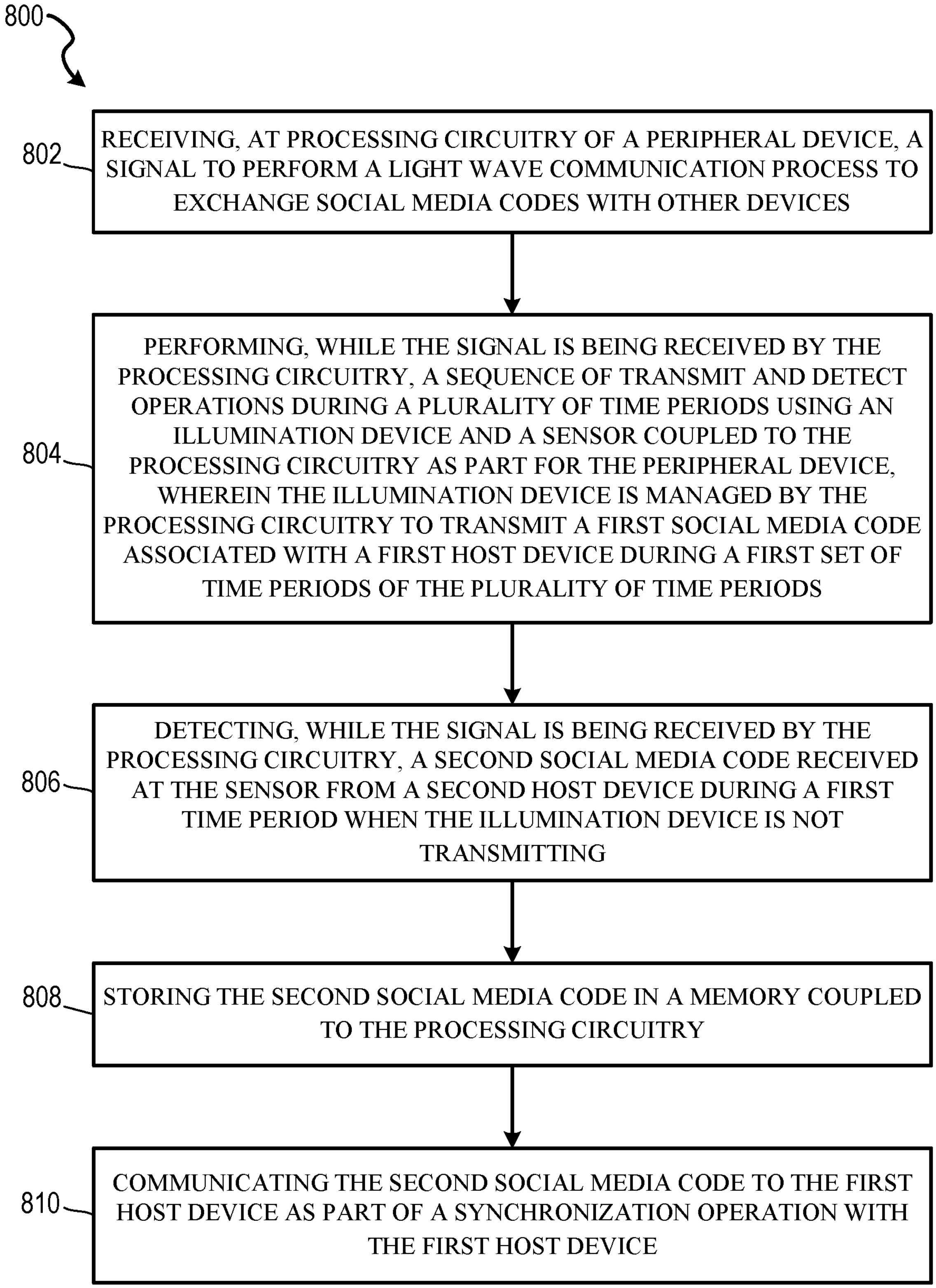
FIG. 8 illustrates a method of low power light wave communication in accordance with some embodiments.

FIG. 8 then illustrates a method 800 in accordance with some embodiments. In some embodiments, method 800 is performed by a peripheral device as described herein. In some embodiments, method 800 is embodied by instructions stored in a non-transitory computer readable medium (e.g. a memory), that when executed by processing circuitry of a device, cause the device to perform the described method.

Method 800 begins with operation 802 involving receiving, at processing circuitry of a peripheral device, a signal to perform a light wave communication process to exchange social media codes with other devices. Then operation 804 involves performing, while the signal is being received by the processing circuitry, a sequence of transmit and detect operations during a plurality of time periods using an illumination device and a sensor coupled to the processing circuitry as part for the peripheral device. During such operations, the illumination device (e.g. one or more LEDs) is managed by the processing circuitry to transmit a first social media code associated with a first host device during a first set of time periods of the plurality of time periods Additionally, while the signal is being received by the processing circuitry, operation 806 involves detecting a second social media code received at the sensor from a second host device during a first time period when the illumination device is not transmitting. In some embodiments, a device may sense during some or all time periods, and may fail to detect a code. This may be due to the lack of a corresponding transmitting second peripheral, excessive noise, crosstalk, or other such reasons.

For a successful receipt of information, operation 808 involves storing the second social media code in a memory coupled to the processing circuitry. As described above, some embodiments can store additional information, such as information about a time from beginning of the communication process to successful receipt of the second social media code, information about processes which end without successful receipt of a social media code, information about multiple media codes during a single communication process (e.g. a single held button press which successfully detects and stores multiple different media codes), a number of times that a specific individual code was successfully detected during a light wave communication process, or other such data. Then operation 810 involves communicating the second social media code to the first host device as part of a synchronization operation with the first host device. As described above, a benefit of embodiments described herein is the ability of a peripheral device closely coupled to a host device to operate independently of the host device without a need to power on a host device or navigate to a particular menu or application of the host device. Instead, a physical button on a wearable device, host device case, or peripheral device attached to (e.g. glued to the side of or integrated with a body/covering of) a host device can engage in a simple low power light wave communication operation to exchange social media codes or similar data. Some embodiments can thus operate with a physical button to initiate and end the communication process. Some embodiments can operate with the illumination device, the processing circuitry, a battery coupled to the processing circuitry, and the memory are embedded in a case surrounding the first host device. In some embodiments, the signal (e.g. received at a microprocessor or other control circuitry) is received at the processing circuitry in response to the physical button being in a pressed position. In some embodiments, the first set of time periods (e.g. transmission time periods) are randomly selected by the processing circuitry to target transmission of the first social media code during 30% of the time periods of the plurality of time periods while the signal is being received by the processing circuitry In some embodiments, the sequence of transmit and detect operations are performed when the first host device is in a powered off state. In some embodiments, the second social media code is communicated to a social media application operating on the first host device when the first host device is in a powered on state In various other embodiments, additional configurations and operations can be used. While certain specific operations are described above, it will be apparent that some embodiments may operate with intervening or repeated operations, and that various different methods are possible within the scope of the described innovations.

One embodiments is a device comprising: an illumination device comprising one or more light sources; a sensor, and a microcontroller constructed to control the sensor and the illumination device to transmit and receive light patterns to perform a light wave communication process to exchange social media codes with other devices; a battery coupled to the microcontroller and configured to provide power to the microcontroller; a memory coupled to the microcontroller and configured to store one or more social media codes; and communication circuitry separate from the illumination device and the microcontroller configured to communicate, with a host device, share data associated with the light wave communication process to exchange the social media codes with another device.

Some such embodiments optionally includes further comprising a housing surrounding the host device as a protective case for the host device, wherein the illumination device, the battery, the sensor, the microcontroller, the memory, and the communication circuitry are embedded in the housing.

An additional embodiment comprises a glasses frame for a pair of eyeglasses, wherein the illumination device, the battery, the sensor, the microcontroller, the memory, and the communication circuitry are embedded in the housing. Another example may further comprise a physical button coupled to the microcontroller, wherein the microcontroller is configured to manage performance of the light wave communication process when the physical button is depressed, and to maintain a low power or off state when the physical button is not depressed.

In some embodiments, the light wave communication process comprises transmitting a first social media code during a first set of time periods using the illumination device, and sensing for one or more remote social media codes during a second set of time periods different than the first set of time periods, such that the device does not transmit and sense at the same time. In some embodiments, the microcontroller is configured to initiate transmission of the first social media code during a randomly selected set of three time periods of every ten time periods while the physical button is depressed, and to manage sensing for the one or more remote social media codes during remaining time periods. Some such embodiments include an output device coupled to the microcontroller and configured to create an output notification when a remote social media code is successfully received and stored in the memory. Similarly, some embodiments operate wherein the output device comprises a speaker configured to create a first output noise when the remote social media code is successfully received and stored in the memory. In some such embodiments, a speaker is configured to output a second output noise when the microcontroller detects interferences from multiple social media codes detected at the sensor at the same time.

Some embodiments operate where the device is physically attached to the host device, wherein the host device comprises one or more processors configured to implement a social media application, the social media code being associated with a user and the social media application, wherein the microcontroller controls the illumination device independent of the mobile client device being activated or the social media application being activated. Some such embodiments operate where the microcontroller is configured to communicate the share data to the social media application in response to a synchronize request from the mobile client device when the mobile client device is activated. Some such embodiments operate where the share data comprises a meeting log generated based on the shared social media code, the meeting log including names, faces, locations and times. Some such embodiments operate where the memory is configured to store the meeting log prior to receipt of the synchronize request; and wherein the meeting log is automatically deleted from the memory following communication of the share data to the social media application.

Another example embodiment is a device comprising: an illumination device comprising one or more light sources; a microcontroller coupled to the illumination device, the microcontroller configured to control the illumination device to project light patterns to perform a light wave communication process to share a social media code with another device; a memory coupled to the microcontroller and configured to store one or more social media codes; and communication circuitry separates from the illumination device and the microcontroller configured to communicate, with a host device, share data associated with the light wave communication process to share the social media code with another device.

Some such embodiments operate where the device comprises a case surrounding the host device; and wherein the communication circuitry comprises wireless circuitry configured to communicate with the host device via a wireless connection. Some such embodiments further involve a manual switch (e.g. input device) coupled to the microcontroller and constructed to initiate the light wave communication process using the microcontroller when the manual switch is activated. In some such embodiments, the illumination device comprises an infrared light-emitting diode. In some embodiments, the illumination device further or alternatively comprises a plurality of color light-emitting diodes.

Another embodiment is a device comprising: an illumination device; and a microcontroller constructed to control the illumination device to project light patterns to perform a light wave communication process to share a social media code with another device; a memory coupled to the microcontroller and configured to store one or more social media codes.

Still another embodiment is a device comprising: an illumination device; and a microcontroller constructed to control the illumination device to project light patterns to perform a light wave communication process to share a social media code with another device, wherein the microcontroller controls the illumination device to flicker on and off to convert the social media code into a temporal code. Some such embodiments additionally include a manual switch constructed to initiate the light wave communication process. In some such embodiments, the illumination device is a white light-emitting diode, a color light-emitting diode, or an infrared light-emitting diode.

In some embodiments the device is coupled to a mobile client device (e.g. a host device) including a social media application, the social media code being associated with a user and the social media application, wherein the microcontroller controls the illumination device independent of the mobile client device being activated or the social media application being activated. For some such embodiments, a meeting log is generated based on the shared social media code, the meeting log including names, faces, locations and times.

Another embodiment is a device comprising: an illumination device; and a microcontroller constructed to control the illumination device to receive light patterns to perform a light wave communication process to receive a social media code from another device, wherein the microcontroller controls the illumination device to receive temporal code between flickering on and off, wherein the temporal code is associated with the social media code.

Figure 9:
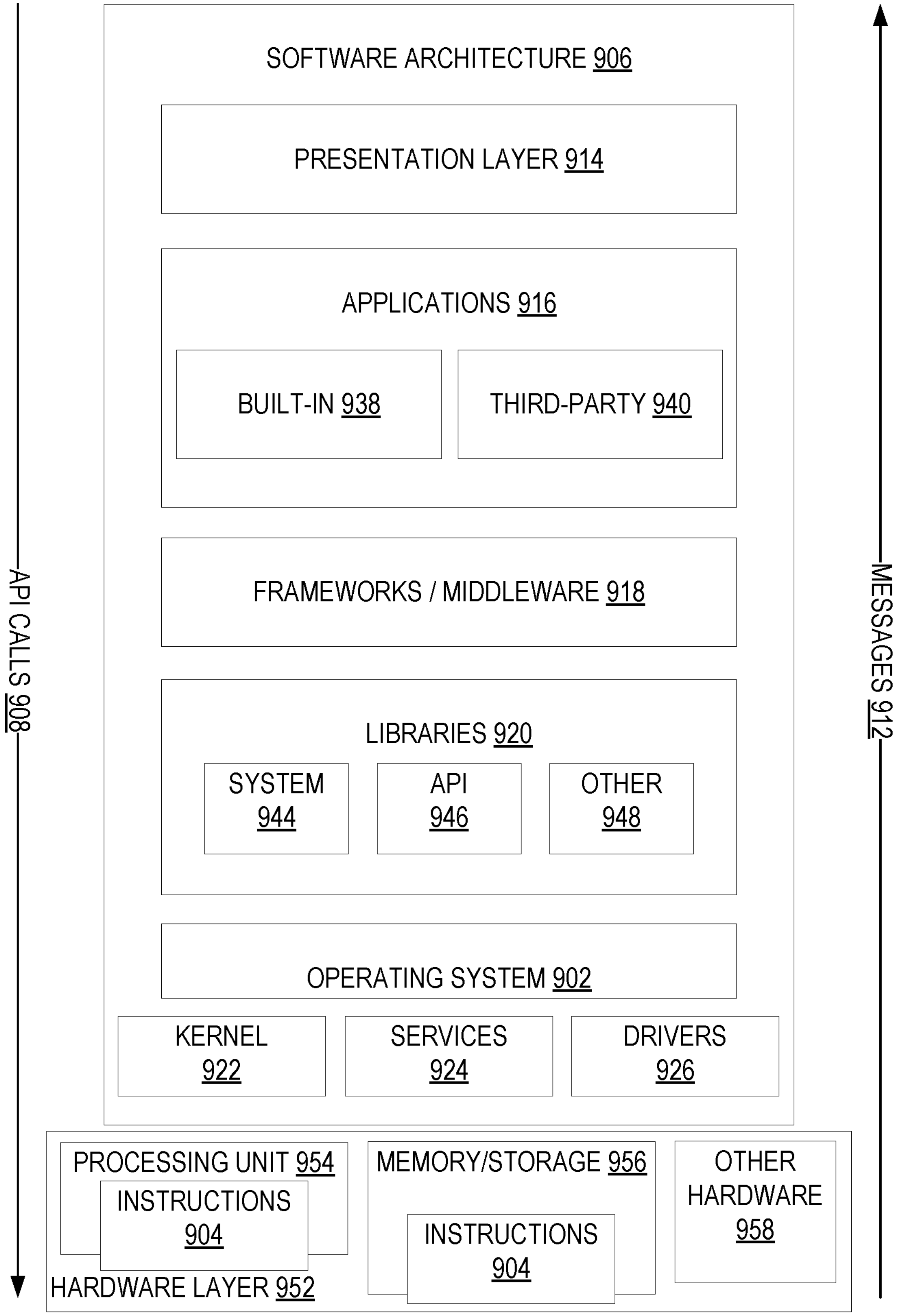
FIG. 9 is a block diagram illustrating a representative software architecture, which may be used in conjunction with various hardware architectures herein described.

FIG. 9 is a block diagram illustrating an example software architecture 906, which may be used in conjunction with various hardware architectures herein described. FIG. 9 is a non-limiting example of a software architecture, and it will be appreciated that many other architectures may be implemented to facilitate the functionality described herein. The software architecture 906 may execute on hardware such as a machine 1000 of FIG. 10 that includes, among other things, processors, memory, and input/output (I/O) components. A representative hardware layer 952 is illustrated and can represent, for example, the machine 1000 of FIG. 10. The representative hardware layer 952 includes a processing unit 954 having associated executable instructions 904. The executable instructions 904 represent the executable instructions of the software architecture 906, including implementation of the methods, components, and so forth described herein. The hardware layer 952 also includes a memory/storage 956, which also has the executable instructions 904. The hardware layer 952 may also comprise other hardware 958.

In the example architecture of FIG. 9, the software architecture 906 may be conceptualized as a stack of layers where each layer provides particular functionality. For example, the software architecture 906 may include layers such as an operating system 902, libraries 920, frameworks/middleware 918, applications 916, and a presentation layer 914. Operationally, the applications 916 and/or other components within the layers may invoke API calls 908 through the software stack and receive a response in the form of messages 912. The layers illustrated are representative in nature, and not all software architectures have all layers. For example, some mobile or special-purpose operating systems may not provide a frameworks/middleware 918, while others may provide such a layer. Other software architectures may include additional or different layers.

The operating system 902 may manage hardware resources and provide common services. The operating system 902 may include, for example, a kernel 922, services 924, and drivers 926. The kernel 922 may act as an abstraction layer between the hardware and the other software layers. For example, the kernel 922 may be responsible for memory management, processor management (e.g., scheduling), component management, networking, security settings, and so on. The services 924 may provide other common services for the other software layers. The drivers 926 are responsible for controlling or interfacing with the underlying hardware. For instance, the drivers 926 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 920 provide a common infrastructure that is used by the applications 916 and/or other components and/or layers. The libraries 920 provide functionality that allows other software components to perform tasks in an easier fashion than by interfacing directly with the underlying operating system 902 functionality (e.g., kernel 922, services 924, and/or drivers 926). The libraries 920 may include system libraries 944 (e.g., C standard library) that may provide functions such as memory allocation functions, string manipulation functions, mathematical functions, and the like. In addition, the libraries 920 may include API libraries 946 such as media libraries (e.g., libraries to support presentation and manipulation of various media formats such as MPEG4, H.264, MP3, AAC, AMR, JPG, or PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 920 may also include a wide variety of other libraries 948 to provide many other APIs to the applications 916 and other software components/modules.

The frameworks/middleware 918 provide a higher-level common infrastructure that may be used by the applications 916 and/or other software components/modules. For example, the frameworks/middleware 918 may provide various graphic user interface (GUI) functions, high-level resource management, high-level location services, and so forth. The frameworks/middleware 918 may provide a broad spectrum of other APIs that may be utilized by the applications 916 and/or other software components/modules, some of which may be specific to a particular operating system 902 or platform.

The applications 916 include built-in applications 938 and/or third-party applications 940. Examples of representative built-in applications 938 may include, but are not limited to, a contacts application, a browser application, a book reader application, a location application, a media application, a messaging application, and/or a game application. The third-party applications 940 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 940 may invoke the API calls 908 provided by the mobile operating system (such as the operating system 902) to facilitate functionality described herein.

The applications 916 may use built-in operating system functions (e.g., kernel 922, services 924, and/or drivers 926), libraries 920, and frameworks/middleware 918 to create user interfaces to interact with users of the system. Alternatively, or additionally, in some systems, interactions with a user may occur through a presentation layer, such as the presentation layer 914. In these systems, the application/component "logic" can be separated from the aspects of the application/component that interact with a user.

Figure 10:
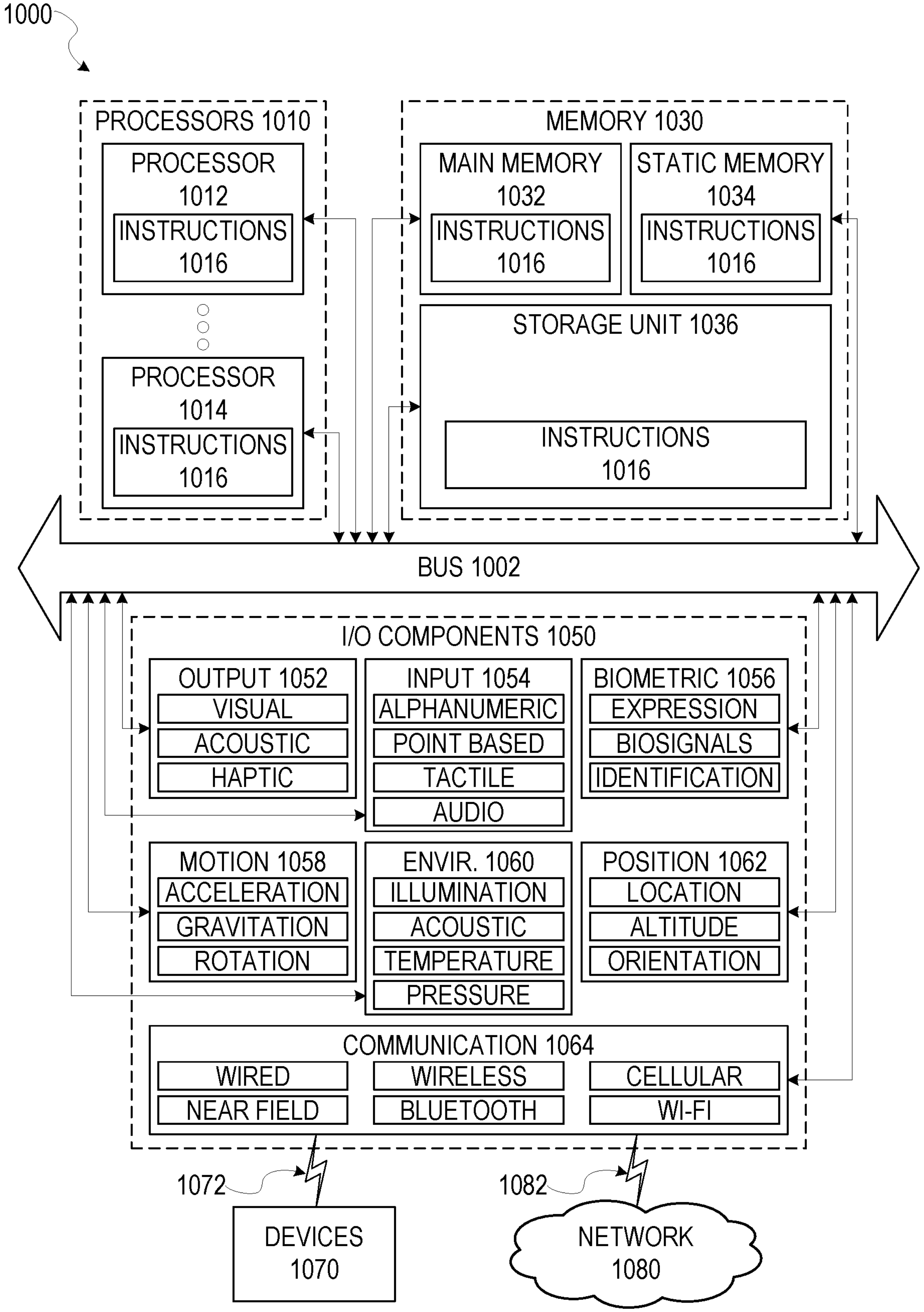
FIG. 10 is a block diagram illustrating components of a machine, according to some example embodiments, able to read instructions from a machine-readable medium (e.g., a machine-readable storage medium) and perform any one or more of the methodologies discussed herein.

FIG. 10 is a block diagram illustrating components of a machine 1000, according to some example embodiments, able to read instructions from a machine-readable medium (e.g., a machine-readable storage medium) and perform any one or more of the methodologies discussed herein. Specifically, FIG. 10 shows a diagrammatic representation of the machine 1000 in the example form of a computer system, within which instructions 1016 (e.g., software, a program, an application, an applet, an app, or other executable code) for causing the machine 1000 to perform any one or more of the methodologies discussed herein may be executed. As such, the instructions 1016 may be used to implement modules or components described herein. The instructions 1016 transform the general, non-programmed machine 1000 into a particular machine 1000 programmed to carry out the described and illustrated functions in the manner described. In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smart watch), a smart home device (e.g., a smart appliance), other smart devices, a web appliance, a network router, a network switch, a network bridge, or any machine capable of executing the instructions 1016, sequentially or otherwise, that specify actions to be taken by the machine 1000. Further, while only a single machine 1000 is illustrated, the term "machine" shall also be taken to include a collection of machines that individually or jointly execute the instructions 1016 to perform any one or more of the methodologies discussed herein.

The machine 1000 may include processors 1010, memory/storage 1030, and I/O components 1050, which may be configured to communicate with each other such as via a bus 1002. The memory/storage 1030 may include a memory 1032, such as a main memory, or other memory storage, and a storage unit 1036, both accessible to the processors 1010 such as via the bus 1002. The storage unit 1036 and memory 1032 store the instructions 1016 embodying any one or more of the methodologies or functions described herein. The instructions 1016 may also reside, completely or partially, within the memory 1032, within the storage unit 1036, within at least one of the processors 1010 (e.g., within the processor cache memory accessible to processors 1012 or 1014), or any suitable combination thereof, during execution thereof by the machine 1000. Accordingly, the memory 1032, the storage unit 1036, and the memory of the processors 1010 are examples of machine-readable media.

The I/O components 1050 may include a wide variety of components to receive input, provide output, produce output, transmit information, exchange information, capture measurements, and so on. The specific I/O components 1050 that are included in a particular machine 1000 will depend on the type of machine. For example, portable machines such as mobile phones will likely include a touch input device or other such input mechanisms, while a headless server machine will likely not include such a touch input device. It will be appreciated that the I/O components 1050 may include many other components that are not shown in FIG. 10. The I/O components 1050 are grouped according to functionality merely for simplifying the following discussion, and the grouping is in no way limiting. In various example embodiments, the I/O components 1050 may include output components 1052 and input components 1054. The output components 1052 may include light wave components (e.g., a display such as a plasma display panel (PDP), a light-emitting diode (LED) display, a liquid-crystal display (LCD), a projector, or a cathode ray tube (CRT)), acoustic components (e.g., speakers), haptic components (e.g., a vibratory motor, resistance mechanisms), other signal generators, and so forth. The input components 1054 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further example embodiments, the I/O components 1050 may include biometric components 1056, motion components 1058, environment components 1060, or position components 1062, among a wide array of other components. For example, the biometric components 1056 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1058 may include acceleration sensor components (e.g., accelerometer), gravitation sensor components, rotation sensor components (e.g., gyroscope), and so forth. The environment components 1060 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas sensors to detect concentrations of hazardous gases for safety or to measure pollutants in the atmosphere), or other components that may provide indications, measurements, or signals corresponding to a surrounding physical environment. The position components 1062 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1050 may include communication components 1064 operable to couple the machine 1000 to a network 1080 or devices 1070 via a coupling 1082 and a coupling 1072, respectively. For example, the communication components 1064 may include a network interface component or other suitable device to interface with the network 1080. In further examples, the communication components 1064 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1070 may be another machine or any of a wide variety of peripheral devices (e.g., a peripheral device coupled via a USB).

Moreover, the communication components 1064 may detect identifiers or include components operable to detect identifiers. For example, the communication components 1064 may include radio frequency identification (RFID) tag reader components, NFC smart tag detection components, optical reader components (e.g., an optical sensor to detect one-dimensional barcodes such as Universal Product Code (UPC) barcode, multi-dimensional barcodes such as Quick Response (QR) code, Aztec code, Data Matrix, Dataglyph, MaxiCode, PDF418, Ultra Code, UCC RSS-2D barcode, and other optical codes), or acoustic detection components (e.g., microphones to identify tagged audio signals). In addition, a variety of information may be derived via the communication components 1064, such as location via Internet Protocol (IP) geolocation, location via Wi-Fi® signal triangulation, location via detecting an NFC beacon signal that may indicate a particular location, and so forth.

Glossary

"CARRIER SIGNAL" in this context refers to any intangible medium that is capable of storing, encoding, or carrying instructions 1016 for execution by the machine 1000, and includes digital or analog communications signals or other intangible media to facilitate communication of such instructions 1016. Instructions 1016 may be transmitted or received over the network 1080 using a transmission medium via a network interface device and using any one of a number of well-known transfer protocols.

"CLIENT DEVICE" in this context refers to any machine 1000 that interfaces to a network 1080 to obtain resources from one or more server systems or other client devices 102. A client device 102 may be, but is not limited to, a mobile phone, desktop computer, laptop, PDA, smartphone, tablet, ultrabook, netbook, multi-processor system, microprocessor-based or programmable consumer electronics system, game console, set-top box, or any other communication device that a user may use to access a network 1080.

"COMMUNICATIONS NETWORK" in this context refers to one or more portions of a network 1080 that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network 1080 may include a wireless or cellular network, and the coupling 1082 may be a Code Division Multiple Access (CDMA) connection, a Global System for Mobile communications (GSM) connection, or another type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

"EMPHEMERAL MESSAGE" in this context refers to a message 400 that is accessible for a time-limited duration. An ephemeral message 502 may be a text, an image, a video, and the like. The access time for the ephemeral message 502 may be set by the message sender. Alternatively, the access time may be a default setting or a setting specified by the recipient. Regardless of the setting technique, the message 400 is transitory.

"MACHINE-READABLE MEDIUM" in this context refers to a component, a device, or other tangible media able to store instructions 1016 and data temporarily or permanently and may include, but is not limited to, random-access memory (RAM), read-only memory (ROM), buffer memory, flash memory, optical media, magnetic media, cache memory, other types of storage (e.g., erasable programmable read-only memory (EPROM)), and/or any suitable combination thereof. The term "machine-readable medium" should be taken to include a single medium or multiple media (e.g., a centralized or distributed database, or associated caches and servers) able to store instructions 1016. The term "machine-readable medium" shall also be taken to include any medium, or combination of multiple media, that is capable of storing instructions 1016 (e.g., code) for execution by a machine 1000, such that the instructions 1016, when executed by one or more processors 1010 of the machine 1000, cause the machine 1000 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, a physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor 1012 or a group of processors 1010) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine 1000) uniquely tailored to perform the configured functions and are no longer general-purpose processors 1010. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein.

Considering embodiments in which hardware components are temporarily configured (e.g., programmed), each of the hardware components need not be configured or instantiated at any one instance in time. For example, where a hardware component comprises a general-purpose processor 1012 configured by software to become a special-purpose processor, the general-purpose processor 1012 may be configured as respectively different special-purpose processors (e.g., comprising different hardware components) at different times. Software accordingly configures a particular processor 1012 or processors 1010, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between or among such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors 1010 that are temporarily configured (e.g., by software) or permanently configured to perform the relevant operations. Whether temporarily or permanently configured, such processors 1010 may constitute processor-implemented components that operate to perform one or more operations or functions described herein. As used herein, "processor-implemented component" refers to a hardware component implemented using one or more processors 1010. Similarly, the methods described herein may be at least partially processor-implemented, with a particular processor 1012 or processors 1010 being an example of hardware. For example, at least some of the operations of a method may be performed by one or more processors 1010 or processor-implemented components. Moreover, the one or more processors 1010 may also operate to support performance of the relevant operations in a "cloud computing" environment or as a "software as a service" (SaaS). For example, at least some of the operations may be performed by a group of computers (as examples of machines 1000 including processors 1010), with these operations being accessible via a network 1080 (e.g., the Internet) and via one or more appropriate interfaces (e.g., an API). The performance of certain of the operations may be distributed among the processors 1010, not only residing within a single machine 1000, but deployed across a number of machines 1000. In some example embodiments, the processors 1010 or processor-implemented components may be located in a single geographic location (e.g., within a home environment, an office environment, or a server farm). In other example embodiments, the processors 1010 or processor-implemented components may be distributed across a number of geographic locations.

"PROCESSOR" in this context refers to any circuit or virtual circuit (a physical circuit emulated by logic executing on an actual processor 1012) that manipulates data values according to control signals (e.g., "commands," "op codes," "machine code," etc.) and which produces corresponding output signals that are applied to operate a machine 1000. A processor may, for example, be a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC), or any combination thereof. A processor 1010 may further be a multi-core processor 1010 having two or more independent processors 1012, 1014 (sometimes referred to as "cores") that may execute instructions 1016 contemporaneously.

"TIMESTAMP" in this context refers to a sequence of characters or encoded information identifying when a certain event occurred, for example giving date and time of day, sometimes accurate to a small fraction of a second.

What is claimed is:

1. A device comprising:

one or more light sources;

one or more sensors; and control circuitry configured to:

divide, randomly, a plurality of time periods into a first plurality of time periods and a second plurality of time periods;

configure the one or more light sources to transmit, for each of the first plurality of time periods first encoded data; and sense for second encoded data received by the one or more sensors, for each of the second plurality of time periods, wherein the first plurality of time periods are different than the second plurality of time periods.

2. The device of claim 1, wherein the one or more light sources are lower power light sources.

3. The device of claim 1, wherein the control circuitry is further configured to:

receive a signal to perform light wave communications, and wherein the signal to perform the light wave communications is generated by a user of the device pressing a button of the device or a switch of the device.

4. The device of claim 1, wherein each of the plurality of time periods have a same duration.

5. The device of claim 1, wherein time periods of the plurality of time periods are 1 millisecond (ms), 5 ms, or 100 ms.

6. The device of claim 1, wherein the one or more light sources are light emitting diodes or infrared light sources.

7. The device of claim 1, wherein the control circuitry is further configured to: encode a social media code as the first encoded data.

8. The device of claim 7, wherein the first encoded data comprises a complete social media code.

9. The device of claim 1, wherein the second encoded data comprises a complete social media code.

10. The device of claim 9, wherein the control circuitry is further configured to: in response to the second encoded data comprising the complete social media code, generate an output signal.

11. The device of claim 10, wherein the output signal generates one or more of: a visible light signal having a color indicating successful reception of the complete social media code, the visible light signal having a flashing pattern, the flashing pattern indicating successful reception of the complete social media code, a sound from a speaker of the device, the sound indicating successful reception of the complete social media code, and a sound from a buzzer of the device.

12. The device of claim 1, wherein the second encoded data is received over two consecutive time periods of the second plurality of time periods.

13. The device of claim 12, wherein the second encoded data is sensed for a period of time equal to a duration of a time period of the second plurality of time periods.

14. The device of claim 1, wherein the device is a first device and wherein the second encoded data is received from a second device, and wherein the first device and the second device are physically near one another.

15. The device of claim 1, wherein the control circuitry is further configured to:

transmit the first encoded data by using amplitude modification of output power of the one or more light sources.

16. The device of claim 1, wherein the control circuitry is further configured to:

transmit the first encoded data by turning the one or more light sources on and off.

17. A device comprising:

one or more light sources;

one or more sensors; and a microcontroller configured to:

divide, randomly, a plurality of time periods into a first plurality of time periods and a second plurality of time periods;

configure the one or more light sources to transmit, for each of the first plurality of time periods first encoded data; and sense for second encoded data received by the one or more sensors, for each of the second plurality of time periods, wherein the first plurality of time periods are different than the second plurality of time periods.

18. A method for transmitting first encoded data, the method comprising:

dividing, randomly, a plurality of time periods into a first plurality of time periods and a second plurality of time periods;

configuring one or more light sources to transmit, for each of the first plurality of time periods first encoded data; and sensing for second encoded data received by one or more sensors, for each of the second plurality of time periods, wherein the first plurality of time periods are different than the second plurality of time periods.

19. The method of claim 18, wherein the one or more light sources are lower power light sources.

20. The method of claim 18, wherein the method further comprises:

receiving a signal to perform light wave communications, and wherein the signal to perform the light wave communications is generated by a user of a device pressing a button of the device or a switch of the device.

* * * * *